(12) United States Patent
Ebert (10) Patent No.: US 8,939,518 B2
(45) Date of Patent: Jan. 27, 2015

(54) TRACTOR AND TRAILER SPINDLE ASSEMBLIES

(76) Inventor: James L. Ebert, Huron, OH (US)

( * ) Notice: Subject to any disclaimer, the term of this patent is extended or adjusted under 35 U.S.C. 154(b) by 429 days.

(21) Appl. No.: 13/371,059

(22) Filed: Feb. 10, 2012

(65) Prior Publication Data

US 2013/0207450 A1 Aug. 15, 2013

(51) Int. Cl.
*B60B 35/04* (2006.01)

(52) U.S. Cl.
USPC .......................................... 301/132; 301/131

(58) Field of Classification Search
CPC ........ B60B 35/02; B60B 35/04; B60B 35/08; B60B 35/14
USPC .............. 301/124.1, 126, 128, 130, 131, 132, 301/137; 29/402.06, 402.08, 402.09, 29/402.11, 402.13, 402.16
See application file for complete search history.

(56) References Cited

U.S. PATENT DOCUMENTS

| | | | | |
|---|---|---|---|---|
| 1,480,223 A | * | 1/1924 | Robechaud | 301/130 |
| 1,547,444 A | * | 7/1925 | Rankin et al. | 301/130 |
| 3,037,818 A | * | 6/1962 | Scheel | 301/124.1 |
| 3,701,564 A | * | 10/1972 | Puzik | 301/131 |
| 4,455,732 A | | 6/1984 | Shiets | |
| 4,467,955 A | | 8/1984 | Maupin, Jr. | |
| 4,571,795 A | | 2/1986 | Shiets | |
| 4,792,080 A | | 12/1988 | Ferrari | |
| 4,828,328 A | * | 5/1989 | Bowman | 301/130 |
| 5,966,812 A | | 10/1999 | Shiets | |
| 6,024,418 A | | 2/2000 | Ebert | |
| 7,066,690 B2 | | 6/2006 | Ebert | |

* cited by examiner

*Primary Examiner* — Kip T Kotter
(74) *Attorney, Agent, or Firm* — David D. Murray; Vivacqua Law, PLLC

(57) ABSTRACT

An improved replacement axle spindle includes a cylindrical wall exhibiting increasing thickness at increasing distances from the inner end which is secured to an axle. The wall thickness increases in correspondence with the load borne by the replacement spindle resulting in no loss of necessary strength and load carrying ability. Several different profiles are embodied in the present invention: a first embodiment utilizes a straight internal taper; a second embodiment utilizes a dual internal taper, first at a small angle and then at a larger angle; another embodiment utilizes a parabolic internal taper and yet another embodiment utilizes a straight external taper. All may be utilized to replace a tractor or a trailer axle spindle. The spindles save weight and facilitate lubricant flow from the tractor differential into the axle roller bearing assemblies after a repair procedure.

20 Claims, 9 Drawing Sheets

TRACTOR AND TRAILER SPINDLE ASSEMBLIES

FIELD

The present disclosure relates to spindles for installation in the terminal portion of tractor and trailer axles and more specifically to improved replacement spindles for the terminal portion of tractor and trailer axles.

BACKGROUND

The statements in this section merely provide background information related to the present disclosure and may or may not constitute prior art.

The wheels of tractors and trailers are supported on stationary, transverse axles attached to suspension components of the tractor or trailer which are, in turn, attached to the vehicle frame. As such, the axles represent the interface between the rotating tire and wheel assemblies and the stationary structure of the vehicle. To reduce friction and extend the service life of the interface components, roller bearing assemblies are utilized in pairs on a stepped terminal portion of the axle at each wheel location. Generally speaking, a larger diameter roller bearing assembly is disposed on an inner, larger diameter bearing surface of the axle and a smaller diameter roller bearing assembly is disposed on an outer, smaller diameter bearing surface.

Although well designed, given that many tractors, trailers, other long haul vehicles and delivery trucks log one hundred thousand miles of service per year or more, it is not surprising that these bearing assemblies and the axles upon which they rotate are subject to failure. Such failures are seldom predictable and they are therefore not especially amenable to preventative maintenance. Hence, the failure will frequently occur at some distance from a truck terminal or a qualified repair shop.

In response to this problem, certain procedures have been developed to facilitate repair of tractor, trailer and long haul vehicle axles at the failure site. One of these is presented in U.S. Pat. No. 4,098,029. Here, weld material is built up on worn or damaged bearing surfaces and then ground down to achieve a coaxial, round bearing surface. Another approach is presented in U.S. Pat. No. 4,455,732. Here, an apparatus and method are taught which are directed to boring a concentric opening in the end of an axle into which is installed a replacement axle stub which is then welded in place.

My U.S. Pat. No. 6,024,418 illustrates a more recent improvement in axle repair. In this repair method, a long spindle having both inner and outer bearing surfaces and threads is utilized with a sleeve or liner. After the damaged end of the axle has been removed, the spindle and liner are installed in the axle and welded at several locations away from regions of high stress.

After an axle repair is complete, it is generally necessary to lubricate the ball bearing assemblies installed on the inner and outer bearing surfaces. One way this has been achieved when the repair involves a tractor axle involves lifting the side of the tractor opposite the repair location so that a small portion of the gear lubricant in the differential flows down the axle to the bearings to lubricate them. While satisfactory from a lubrication standpoint, the design of the spindle may be such that it inhibits such lubricant flow unless the tractor is tilted to an unacceptably large angle. Accordingly, there is a need for an improved spindle configuration that facilitates tractor axle bearing lubrication through the just described process.

Additionally, while the replacement spindle utilized in this method is strong and exhibits a large factor of safety, the replacement spindle and sleeve may weigh forty pounds or more. If, as is often the case, all four spindles of a trailer are replaced at the same time, the added weight, i.e., taking into account the weight of the removed, damaged axle portion, may still total approximately one hundred pounds. Thus, there is also a need to provide a lower weight spindle replacement which provides the necessary strength and desired factor of safety.

SUMMARY

The present invention provides improved replacement axle spindles having a wall exhibiting increased thickness at increasing distances from the inner end which is secured to an axle. The wall thickness increases in correspondence with the load borne by the replacement spindle resulting in no loss of necessary strength and load carrying ability. Eight different combinations of profiles and liners are encompassed by the present invention: a first embodiment utilizes a straight internal taper with a single long liner; a second embodiment utilizes a dual internal taper, first at a small angle and then at a larger angle, with a single seal liner; a third embodiment utilizes a straight internal taper with a pair of short liners; a fourth embodiment utilizes a parabolic internal taper with a pair of short liners; a fifth embodiment utilizes a straight internal taper with a large diameter liner and seal liner; a sixth embodiment utilizes a long straight external taper; a seventh embodiment utilizes a short straight external taper with liners having different inside diameters and a eighth embodiment utilizes a short straight external taper that terminates in a larger diameter cylindrical end region and a single liner. The first five embodiments facilitate the flow of lubricant from a tractor differential into the axle roller bearing assemblies when the tractor is tilted since they exhibit a thin inner or inside edge which is proximate the inner wall of the axle housing and which does not present a significant step or barrier to the flow of lubricant.

Furthermore, all eight embodiments provide a distinct and significant weight saving of from three to twelve pounds per spindle when compared to prior art hollow drive spindles or solid trailer spindles. When all four spindles of a trailer are replaced, as is frequently done, this represents a weight saving of from twelve to nearly fifty pounds.

Thus it is an aspect of the present invention to provide a replacement drive axle spindle having a thin inner edge or lip.

Thus it is a further aspect of the present invention to provide a replacement drive axle spindle having a thin inner edge or lip that facilitates lubricant flow to the axle bearing assemblies.

Thus it is a still further aspect of the present invention to provide a replacement drive or trailer axle spindle weighing significantly less than prior art spindles.

It is a still further aspect of the present invention to provide a replacement trailer axle spindle having a straight internal taper weighing significantly less than prior art spindles.

It is a still further aspect of the present invention to provide a replacement drive axle spindle having a straight internal taper terminating at a thin inner edge or lip that facilitates lubricant flow to the axle bearing assemblies.

It is a still further aspect of the present invention to provide a replacement trailer axle spindle having an internal taper of two distinct angles weighing significantly less than prior art spindles.

It is a still further aspect of the present invention to provide a replacement drive axle spindle having an internal taper of two distinct angles terminating at a thin inner edge or lip that facilitates lubricant flow to the axle bearing assemblies.

It is a still further aspect of the present invention to provide a replacement trailer axle spindle having a parabolic internal taper weighing significantly less than prior art spindles.

It is a still further aspect of the present invention to provide a replacement drive axle spindle having a parabolic internal taper terminating at a thin inner edge or lip that facilitates lubricant flow to the axle bearing assemblies.

It is a still further aspect of the present invention to provide a replacement trailer axle spindle having a straight external taper weighing significantly less than prior art spindles.

It is a still further aspect of the present invention to provide a replacement drive axle spindle having a straight external taper terminating at a larger diameter terminal end portion.

Further aspects, advantages and areas of applicability will become apparent from the description provided herein. It should be understood that the description and specific examples are intended for purposes of illustration only and are not intended to limit the scope of the present disclosure.

DRAWINGS

The drawings presented herein are for illustration purposes only and are not intended to limit the scope of the present disclosure in any way. Like reference numbers in the several drawing figures refer to the same component, element or feature.

In FIGS. 3 through 10, inclusive, the first end portion of a replacement spindle is generally designated by the letters "FP," the second end portion is generally designated by the letters "SP," the intermediate portion is generally designated by the letters "IP," and the wall portion of the replacement spindle is designated by the letter "W."

DETAILED DESCRIPTION

The following description is merely exemplary in nature and is not intended to limit the present disclosure, its application, or uses.

Figures 1, 2:
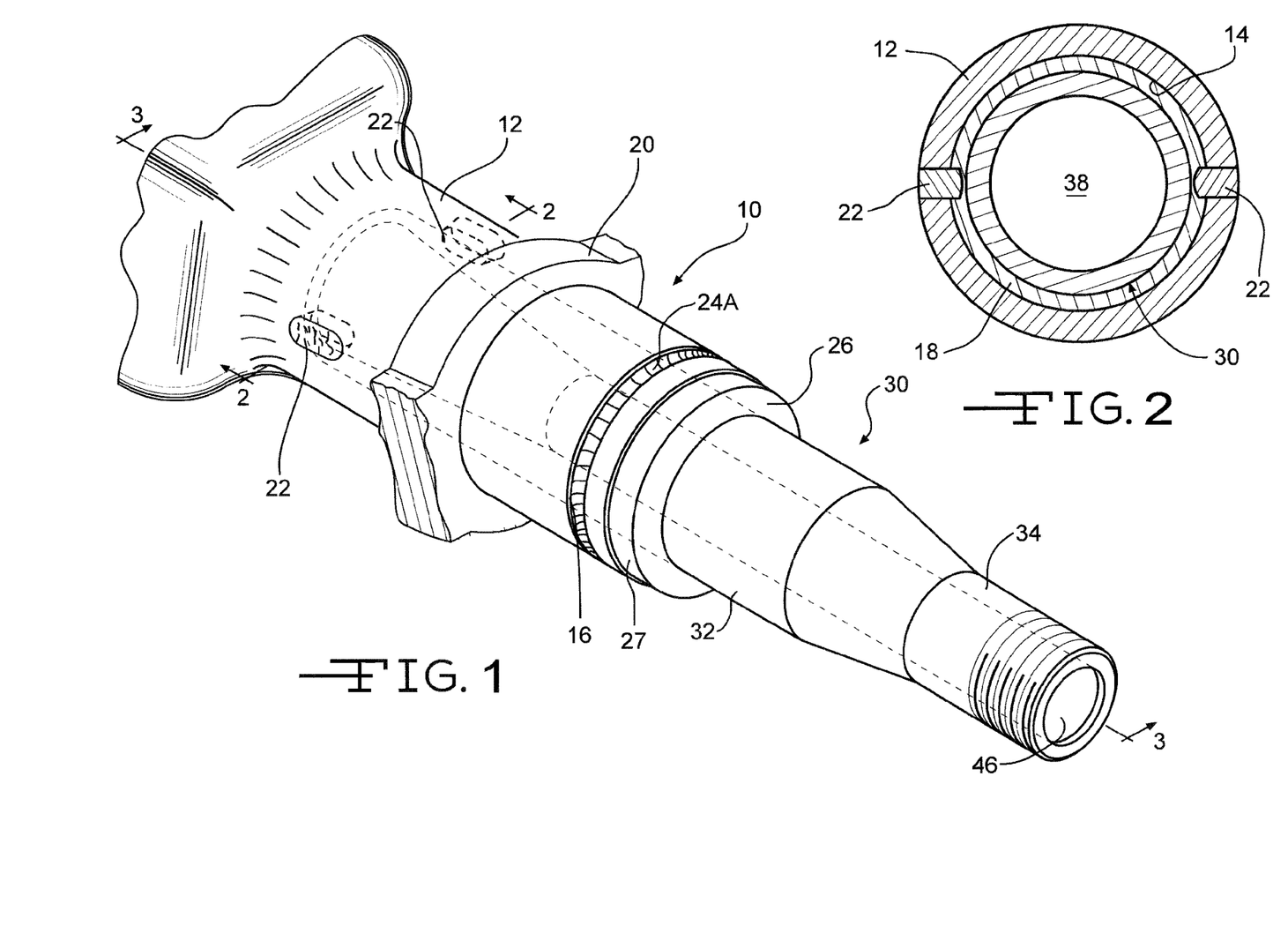
FIG. 1 is a perspective view of a trailer axle incorporating a replacement spindle having a single straight inner taper and a single long liner according to a first embodiment of the present invention.
FIG. 2 is a full sectional view of a trailer axle incorporating a replacement spindle according to the first embodiment of the present invention taken along line 2-2 of FIG. 1.
Figure 3:
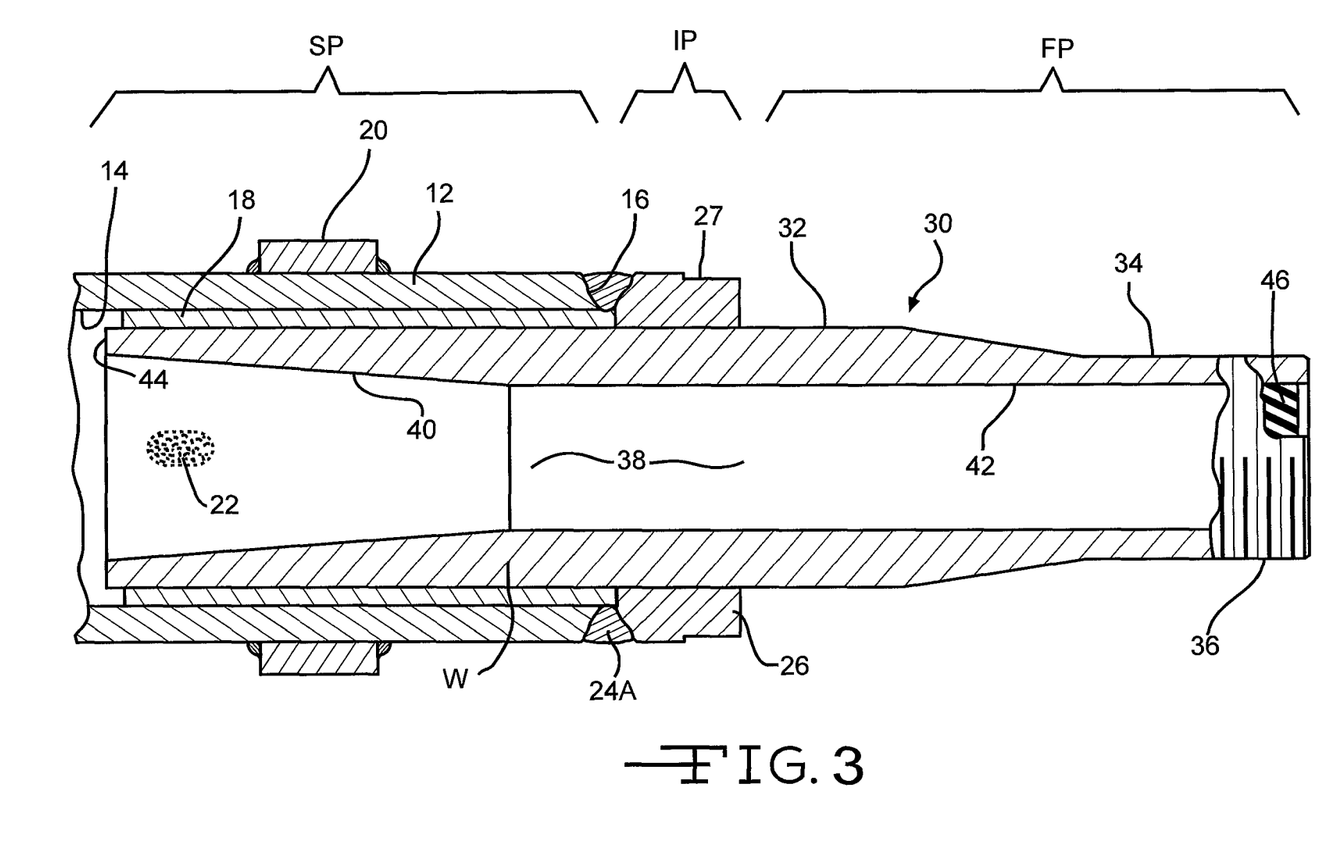
FIG. 3 is a longitudinal, full sectional view of a trailer axle incorporating a replacement spindle having a single angle inner taper and a single long liner according to the first embodiment of the present invention taken along line 3-3 of FIG. 1.

With reference to FIGS. 1, 2 and 3, a truck, trailer or heavy duty vehicle axle assembly which has been repaired utilizing the method disclosed and claimed in U.S. Pat. No. 6,024,418, which is hereby fully incorporated by reference, is illustrated and designated by the reference number 10. Accordingly, the heavy duty vehicle axle assembly 10 includes a vehicle axle 12 having a cylindrical inner surface 14 that has been shortened about a cutoff surface 16 to remove a visibly damaged section and any possibly damaged section (not illustrated). Typically, the removed section includes at least the inner and outer bearing surfaces and threads. A single piece, elongate sleeve or liner 18 has then been disposed at the distal end of a first embodiment of a replacement trailer spindle assembly 30 and this assembly has been installed within the vehicle axle 12 with the exterior surface of the sleeve or liner 18 preferably in contact with the inner surface 14 of the vehicle axle 12. The typical trailer axle 12 also includes a brake spider 20 to which the various components of the trailer brakes (not illustrated) are attached. For reasons of clarity, the brake spider 20 has been broken away in FIG. 1.

A plurality of, preferably two, oblong, horizontally oriented plug welds 22 which extend through the axle 12 and into the liner or sleeve 18 are disposed in a horizontally opposed pair. An annulus of weld material 24A is also deposited (built up) about the replacement spindle assembly 30 adjacent the cutoff surface 16 and in securing contact with the sleeve or liner 18 and a collar 26. The collar 26 has an inside diameter just slightly larger than the largest outside diameter of the replacement trailer spindle assembly 30 and is disposed about the spindle assembly 30 adjacent the cutoff surface 16. The collar 26 includes a concentric, cylindrical oil seal surface 27 which is contacted by an elastomeric seal (not illustrated) disposed on the wheel hub which seals in bearing lubricant and seals out contaminants and foreign matter.

Referring now to FIGS. 1 and 3, the replacement trailer spindle assembly 30 typically includes a first, larger diameter, inner bearing surface 32, a second, smaller diameter, outer bearing surface 34 and a threaded terminal portion 36. It should be appreciated that the more common axle configuration includes the first, larger diameter inner bearing surface 32 and the second, smaller diameter outer bearing surface 34 described. However, certain axles include inner and outer bearing surfaces having the same diameter. It should be appreciated that the present invention is equally suitable for use with these axles.

The inner bearing surface 34 receives, positions and supports a first, typically larger inner roller bearing assembly (not illustrated), the outer bearing surface 34 receives, positions and supports a second, typically smaller diameter roller bearing assembly (not illustrated) and the threaded terminal portion 36 receives a complementarily threaded nut which retains a wheel hub (both not illustrated). The replacement spindle assembly 30 also defines a through passageway 38 having a uniformly tapering, i.e., frusto-conical, first region 40 and a cylindrical, i.e., uniform diameter, second region 42. The tapering, frusto-conical, first region 40 results in a thickness of the end surface 44 which is substantially thinner than prior art configurations in which the wall thickness and the diameter of the through passageway are uniform. Accordingly, the improved replacement trailer spindle assembly 30 represents a significant weight saving. Since the replacement trailer spindle assembly 30 illustrated and described is not being utilized with a drive axle, a resilient plug 46 is disposed at the end of the spindle assembly 30 in the second region 42 of the through passageway 38 to prevent lubricant from entering the axle 12.

Figure 4:
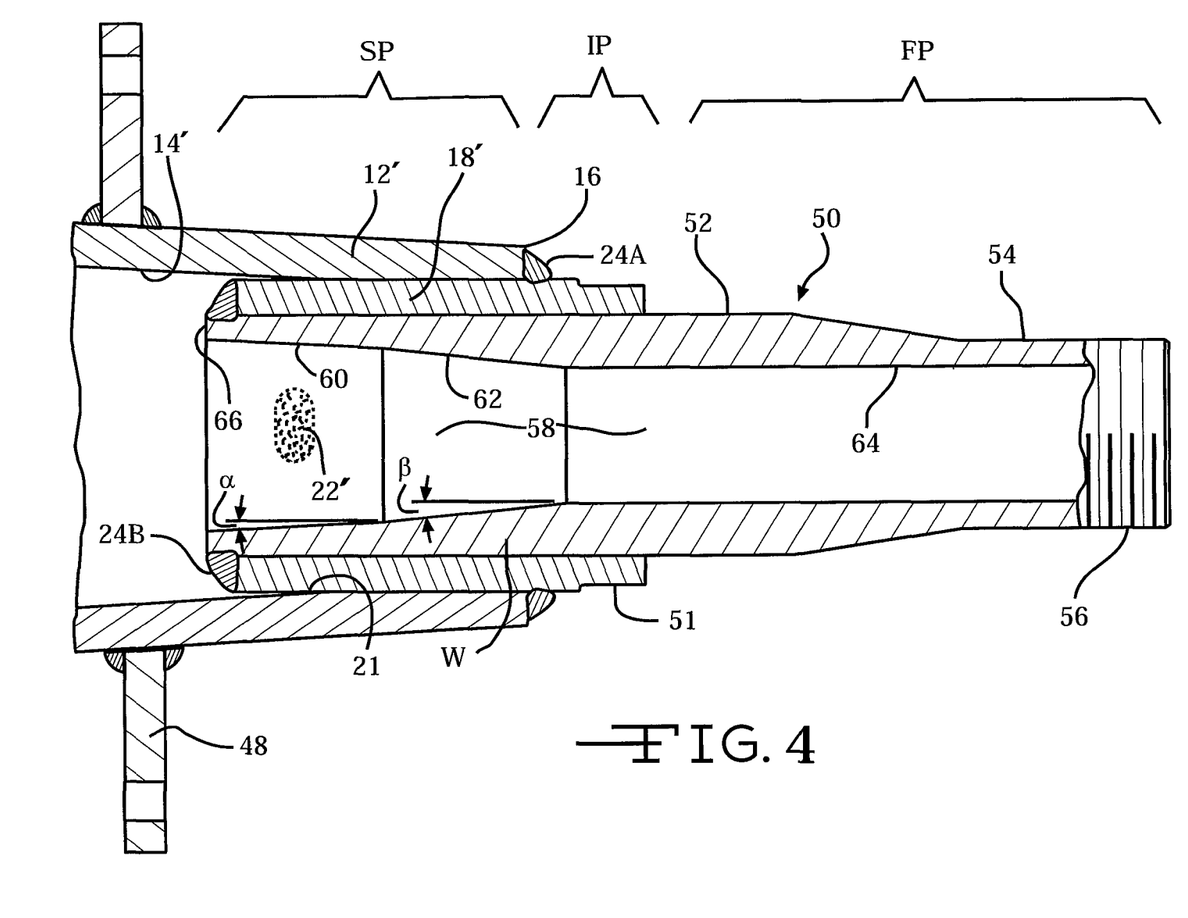
FIG. 4 is a longitudinal, full sectional view of a tractor axle incorporating a replacement spindle having a dual angle inner taper and single seal liner according to a second embodiment of the present invention.

Referring now to FIG. 4, a second embodiment of a replacement spindle assembly designated by the reference number 50 is illustrated. The replacement spindle assembly 50 is a drive axle spindle assembly and is thus being installed in the drive axle 12' of a tractor. The drive axle 12' defines a through passageway 14'. As in the foregoing embodiment, the damaged section of the drive axle 12' is removed, leaving a cutoff surface 16. The drive axle 12' is then bored to form an enlarged diameter region 20 which receives an elongate, single piece sleeve or seal liner 18' and the replacement drive axle spindle assembly 50. The single piece sleeve or liner 18' includes an oil seal surface 51 at its outer end. At its inner end, a circumferential weld 24B extends around the sleeve or liner 18' and secures it to the replacement drive axle spindle assembly 50. A pair of horizontally opposed, vertically oriented, oblong plug welds 22' (one of which is illustrated in FIG. 4) are disposed in openings formed in the drive axle 12' and extend into the sleeve or liner 18'. Finally, an annulus of weld material 24A is deposited (built up) about the replacement drive spindle assembly 50 adjacent the cutoff surface 16. The drive axle 12' typically includes and supports a brake flange 48 proximate its outer end to which the various components of the tractor brakes (not illustrated) are secured.

The replacement drive axle spindle assembly 50 includes a first, larger diameter inner bearing surface 52, a second, smaller diameter outer bearing surface 54 and a threaded terminal portion 56. The inner bearing surface 52 receives, positions and supports a first, larger diameter inner roller bearing assembly (not illustrated), the outer bearing surface 54 receives, positions and supports a second, smaller diameter roller bearing assembly (not illustrated) and the threaded terminal portion 56 receives a complementarily threaded nut which retains a wheel hub (both not illustrated). The replacement spindle assembly 50 also defines a through passageway 58 having a first, uniformly tapering, i.e., frusto-conical, region 60 disposed at a first, small acute angle α to the axis of the replacement spindle assembly 50, a second, uniformly tapering, i.e., frusto-conical, region 62 disposed at a second, larger acute angle β to the axis of the replacement spindle assembly 50 and a longer, cylindrical, i.e., uniform diameter, region 64. The first, small acute angle α of the first, frusto-conical region 60 is preferably about five degrees or, alternatively, in the range of from three to seven degrees and the second, larger acute angle β is preferably about fifteen to twenty-five degrees or, alternatively, in the range of from ten to thirty degrees. Certain applications and situations, however, may require angles outside the just recited ranges and it should be understood that such values are within the scope of the present invention.

The two tapering, frusto-conical regions 60 and 62 result in a thickness of an end surface 66 which is substantially thinner than prior art configurations in which the wall thickness and the diameter of the through passageway were uniform. Accordingly, the improved replacement drive axle spindle assembly 50 represents a significant weight reduction. Additionally, the reduced thickness of the end wall 66 facilitates providing lubrication to the axle roller bearing assemblies by the simple expedient of tilting the tractor or vehicle so that the just replaced drive spindle assembly 50 is lower than the differential.

Figure 5:
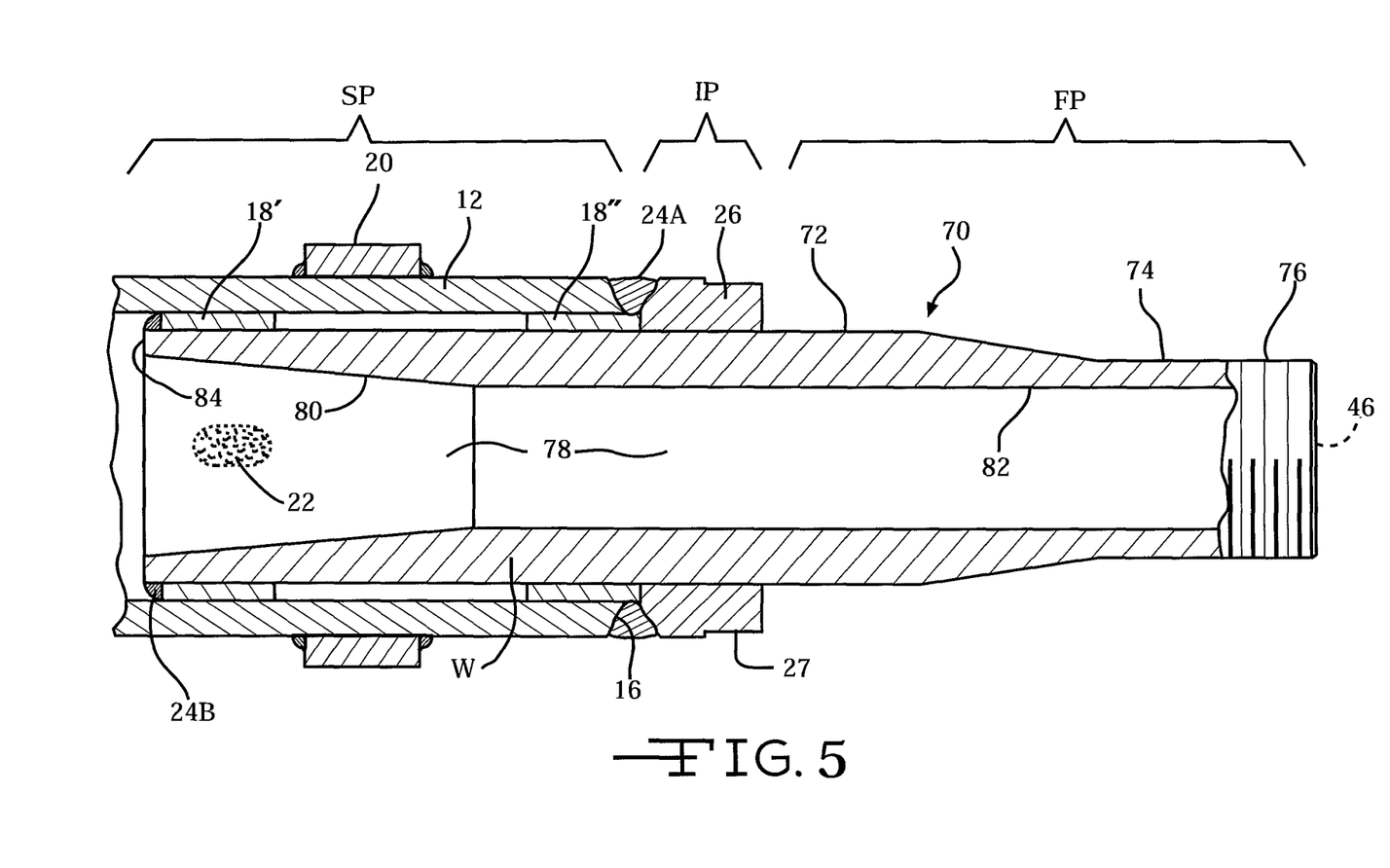
FIG. 5 is a longitudinal, full sectional view of a trailer axle incorporating a replacement spindle having a single angle inner taper and a pair of short liners according to a third embodiment of the present invention.

Referring now to FIG. 5, a third embodiment of a replacement spindle assembly designated by the reference number 70 is illustrated. Here, while the replacement trailer spindle assembly 70 includes the single taper region of the first embodiment replacement trailer spindle assembly 30, instead of utilizing a single sleeve or liner 18, this embodiment utilizes a pair of axially short liners 18" which result in further weight reduction. The pair of short liners 18" are disposed adjacent the cutoff surface 16 and the inner end of the spindle assembly 70, respectively, and are secured in both locations by a respective annulus of weld material 24A and 24B. The annulus of weld material 24A also secures the collar 26 having the oil seal surface 27. The pair of horizontal plug welds 22 (one of which is illustrated in FIG. 5) extend into the inner liner 18" and secure the replacement spindle assembly 70 to the axle 12. Since this embodiment is characterized as a replacement trailer spindle assembly, it also includes the brake spider 20 and the resilient plug 46 (illustrated in FIGS. 1 and 3) at the outer end of the spindle assembly 70.

The replacement trailer spindle assembly 70 includes a first, larger diameter inner bearing surface 72, a second, smaller diameter outer bearing surface 74 and a threaded terminal portion 76. The inner bearing surface 72 receives, positions and supports a first, larger diameter inner roller bearing assembly (not illustrated), the outer bearing surface 74 receives, positions and supports a second, smaller diameter roller bearing assembly (not illustrated) and the threaded terminal portion 76 receives a complementarily threaded nut which retains a wheel hub (both not illustrated). The replacement spindle assembly 70 defines a through passageway 78 having a frusto-conical region 80 and a cylindrical, i.e., uniform diameter, region 82. The frusto-conical region 80, as one moves from an end surface 84 toward the threaded terminal portion 76, defines a region in which the wall thickness uniformly increases. This configuration, as well, results in a width of the end surface 84 which is substantially thinner than prior art designs in which the wall thickness and the diameter of the through passageway were uniform. Accordingly, the improved replacement trailer spindle assembly 70 represents a significant weight saving over prior art configurations which is further enhanced by the use of a pair of short liners 18".

Figure 6:
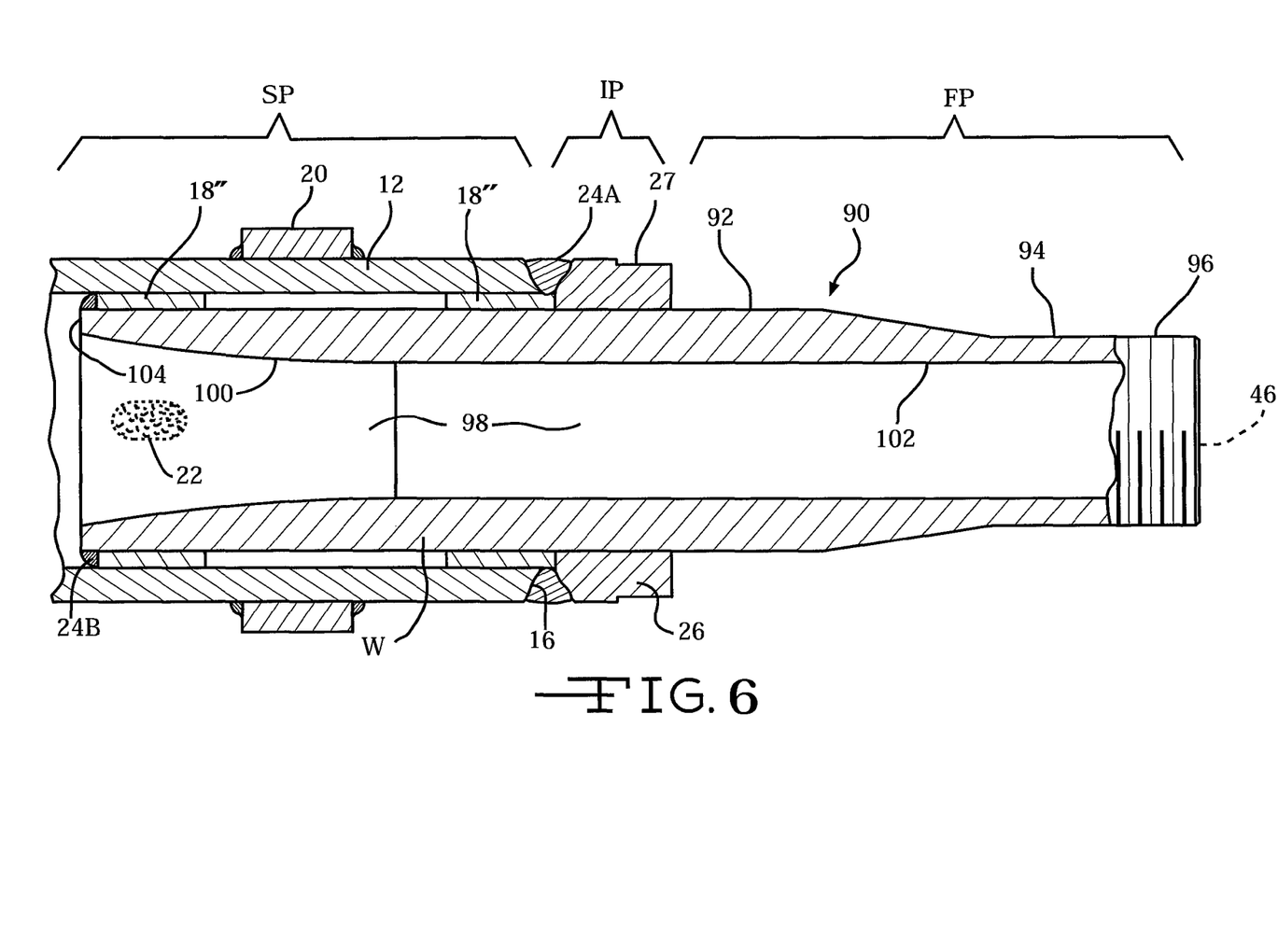
FIG. 6 is a longitudinal, full sectional view of a trailer axle incorporating a replacement spindle having a parabolic inner taper and a pair of short liners according to a fourth embodiment of the present invention.

Referring now to FIG. 6, a fourth embodiment of a replacement spindle assembly designated by the reference number 90 is illustrated. Here, the replacement trailer spindle assembly 90 utilizes the pair of narrow or short liners 18" described in connection with the third embodiment of the replacement trailer spindle assembly 70 directly above but includes another inner surface profile. The pair of short liners 18" are disposed adjacent the cutoff surface 16 and the inner end of the spindle assembly 90. The short liner 18" adjacent the cutoff surface 16 is secured by the annulus of built up weld material 24A to the axle 12 and to the collar 26 having the oil seal surface 27. The short liner 18" adjacent the inner end of the spindle assembly 90 is secured by the annulus of weld material 24B. The pair of horizontal plug welds 22 (one of which is illustrated in FIG. 6) extend into the inner shorter liner 18" and secure the replacement spindle assembly 90 to the axle 12. Since this embodiment is characterized as a replacement trailer spindle assembly, it also includes the resilient plug 46 (illustrated in FIGS. 1 and 3) at the outer end of the spindle assembly 90 as well as the brake spider 20 which receives and supports the brake mechanism of the trailer.

The replacement trailer spindle assembly 90 includes a first, larger diameter inner bearing surface 92, a second, smaller diameter outer bearing surface 94 and a threaded terminal portion 96. The inner bearing surface 92 receives, positions and supports a first, larger diameter inner roller bearing assembly (not illustrated), the outer bearing surface 94 receives, positions and supports a second, smaller diameter roller bearing assembly (not illustrated) and the threaded terminal portion 96 receives a complementarily threaded nut which retains a wheel hub (both not illustrated). The replacement trailer spindle assembly 90 also defines a through passageway 98 having a parabolically tapering region 100 and a cylindrical, i.e., uniform diameter, region 102.

The parabolically tapering region 100, as one moves from an end surface 104 toward the threaded terminal portion 96, defines a region in which the wall thickness increases at a decreasing rate. This configuration tends to mimic or correlate the wall thickness of the replacement trailer spindle assembly 90 with the load and bending moments exerted upon it in service. This configuration, as well, results in a thickness of the end surface 104 which is substantially thinner than prior art configurations in which the wall thickness and the diameter of the through passageway were uniform. Accordingly, the improved replacement spindle assembly 90 represents a significant weight saving over prior art configurations.

Figure 7:
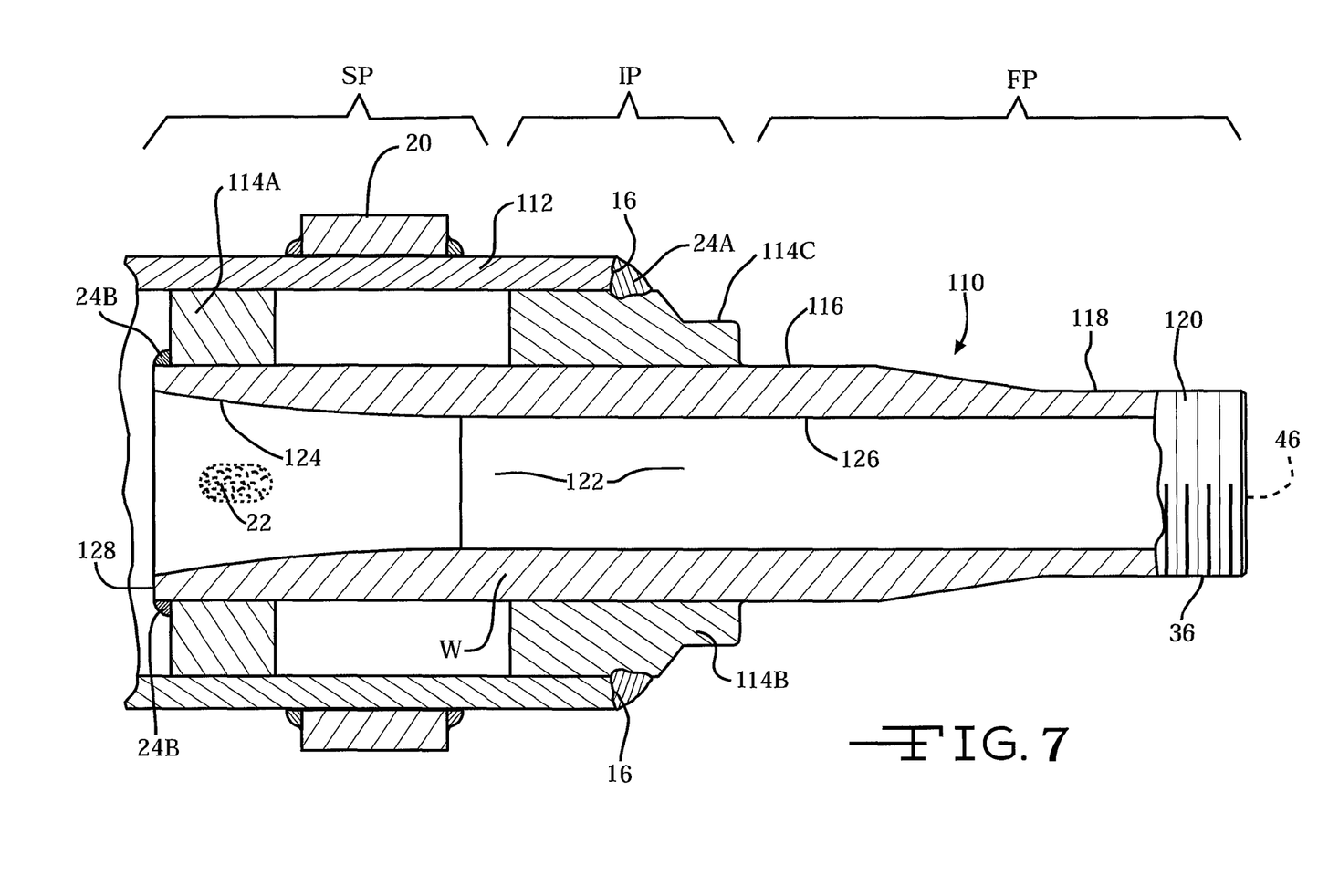
FIG. 7 is a longitudinal, full sectional view of a large diameter trailer axle incorporating a replacement spindle having a parabolic inner taper and a large diameter liner and seal liner according to a fifth embodiment of the present invention.

Referring now to FIG. 7, a fifth embodiment of a replacement spindle assembly, designated by the reference number 110, is illustrated. Here, the replacement trailer spindle assembly 110 is utilized with an axle 112 having a significantly greater inside and outside diameter than those described above, which is typical of many newer axle assemblies. Accordingly, the replacement trailer spindle assembly 110 utilizes a short liner 114A and a seal liner 114B both having significantly greater radial thickness than the sleeves or liners 18' and 18" described above. The pair of liners 114A and 114B include a short inner, annular sleeve or liner 114A and an outer, stepped seal liner 114B having an oil seal surface 114C which are both received on a first, constant diameter, larger bearing surface 116. The inner, annular sleeve or liner 114A is disposed adjacent the inner end of the spindle assembly 110 and the outer, stepped seal liner 114B is disposed adjacent the cutoff surface 16 and are secured in their respective locations by an annulus of built-up weld material 24A and 24B, respectively. The pair of horizontal plug welds 22 (one of which is illustrated in FIG. 7) extend into the inner, annular sleeve or liner 114A and secure the replacement spindle assembly 110 to the axle 112. Since this embodiment is characterized as a replacement trailer spindle assembly, it also includes the resilient plug 46 (illustrated in FIGS. 1 and 3) at the outer end of the spindle assembly 110 as well as the brake spider 20.

It should be appreciated that on occasion, the inner diameter of the axle 112 may not be constant, that is, it may be larger (or smaller) at the location where the inner liner 114A seats relative to where the seal liner 114B seats. This can readily be compensated for and accommodated by manufacturing the inner liner 114A or the seal liner 114B with the same inner diameter (to receive the spindle assembly 110) but with larger or smaller outside diameters. It should be appreciated that other pairs of liners, seals and seal liners, illustrated in the other drawing figures, may be fabricated with different outside diameters to accommodate size differences in inside diameters of axles although this issue manifests itself most frequently with newer, larger axle diameter axles such as that illustrated in FIG. 7.

The replacement trailer spindle assembly 110 includes the first, larger diameter inner bearing surface 116, a second, smaller diameter outer bearing surface 118 and a threaded terminal portion 120. The inner bearing surface 116 receives, positions and supports a first, larger diameter inner roller bearing assembly (not illustrated), the outer bearing surface 118 receives, positions and supports a second, smaller diameter roller bearing assembly (not illustrated) and the threaded terminal portion 120 receives a complementarily threaded nut which retains a wheel hub (both not illustrated). The replacement trailer spindle assembly 110 also defines a through passageway 122 having a parabolically tapering region 124 and a cylindrical, i.e., uniform diameter, region 126.

The parabolically tapering region 124, as one moves from an end surface 128 toward the threaded terminal portion 120, defines a region in which the wall thickness increases at a decreasing rate. This configuration tends to mimic or correlate the wall thickness of the replacement trailer spindle assembly 110 with the load and bending moments exerted upon it in service. This configuration, as well, results in a thickness of the end surface 128 which is substantially thinner than prior art configurations in which the wall thickness and the diameter of the through passageway were uniform. Accordingly, the improved replacement spindle assembly 110 represents a weight saving over prior art configurations. Additional significant weight savings are achieved by the use of two short liners 114A and 114B rather than a single long liner.

Figure 8:
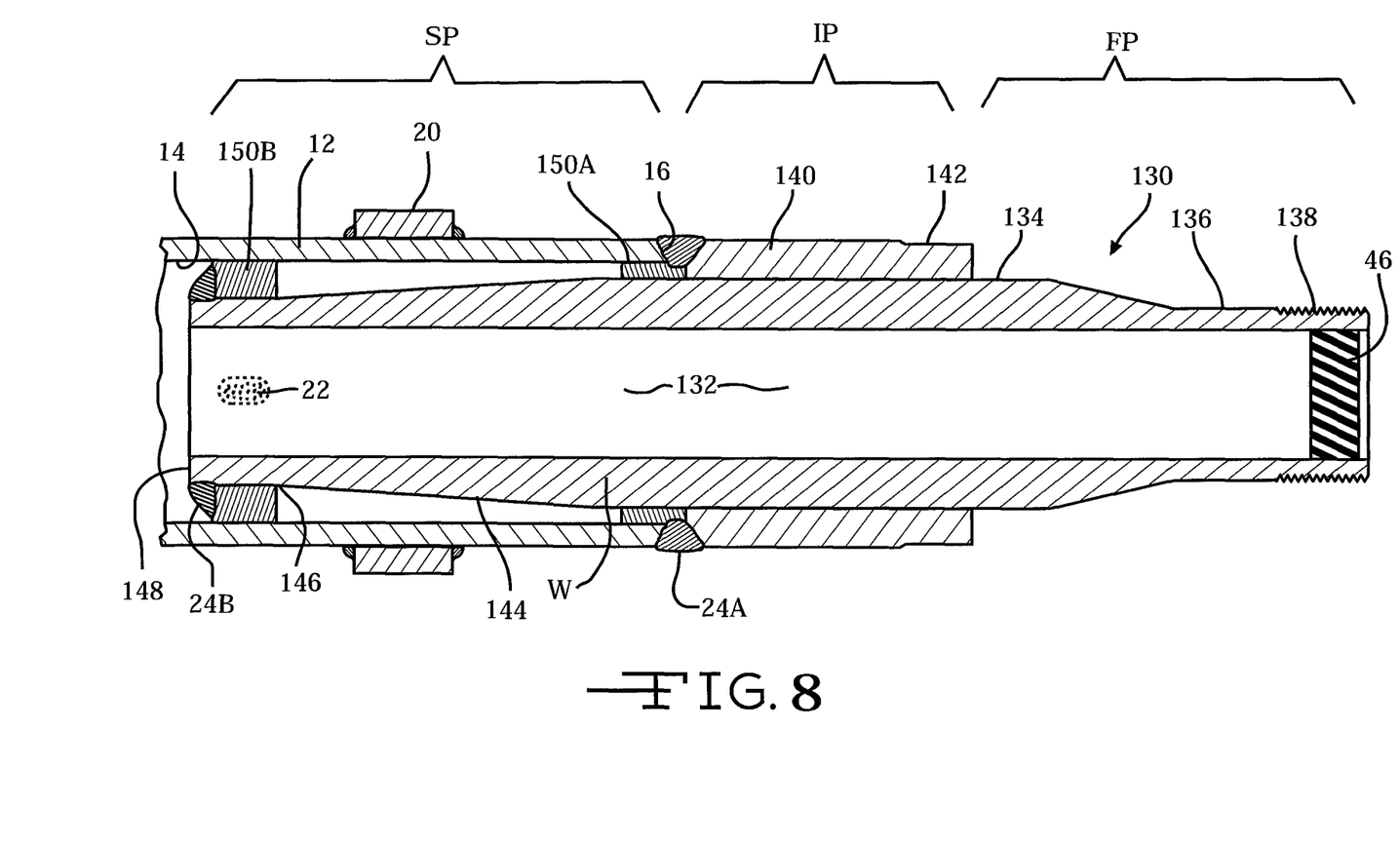
FIG. 8 is a longitudinal, full sectional view of a trailer axle incorporating a replacement spindle having a straight internal passageway, a long straight external taper and a pair of short liners having different inside diameters according to a sixth embodiment of the present invention.

Referring now to FIG. 8, a sixth embodiment of a replacement spindle assembly is illustrated and designated by the reference number 130. Here, the replacement trailer spindle assembly 130 is utilized with the vehicle axle 12 of conventional size defining the internal cylindrical surface 14. As in the previous drawing figures, a damaged portion of the axle (not illustrated) has been removed, leaving the circular cutoff surface 16. The trailer spindle assembly 130 includes a straight walled, i.e., constant diameter, internal through passageway 132, a first, larger diameter inner bearing surface 134, a second, smaller diameter outer bearing surface 136 and a threaded terminal portion 138. As in the other embodiments, the inner bearing surface 134 receives, positions and supports a first, larger diameter inner roller bearing assembly (not illustrated), the outer bearing surface 136 receives, positions and supports a second, smaller diameter roller bearing assembly (not illustrated) and the threaded terminal portion 138 receives a complementarily threaded nut which retains a wheel hub (both not illustrated). Since it is a trailer axle, the resilient plug 46 is disposed at the end of the spindle assembly 130 to inhibit flow of lubricant into the axle 12. Also, the brake spider 20 is secured about the vehicle axle 12.

The first, larger diameter inner bearing surface 134 extends along the middle portion of the spindle assembly 130 and receives a seal liner 140 having an oil seal surface 142 adjacent its outer end. The first, larger diameter bearing surface 134 merges with a long frusto-conical, i.e., constant taper, surface 144 which merges with a short, straight, i.e., constant diameter, cylindrical surface 146 adjacent a thin inner end 148 of the spindle assembly 130. A first, thinner short liner 150A is disposed adjacent the inner end of the seal liner 140 and the circular cutoff surface 16 and these components are secured together by built up weld material 24A. Similarly a second, thicker short liner 150B is disposed on the short straight surface 146 near the thin inner end 148 of the spindle assembly 130 and secured there by built-up weld material 24B. Finally, the pair of horizontally opposed plug welds 22 (one of which is illustrated in FIG. 8) extend through the axle 12 and into the thicker short liner 150B to secure the spindle assembly 130 to the axle 12.

Figure 9:
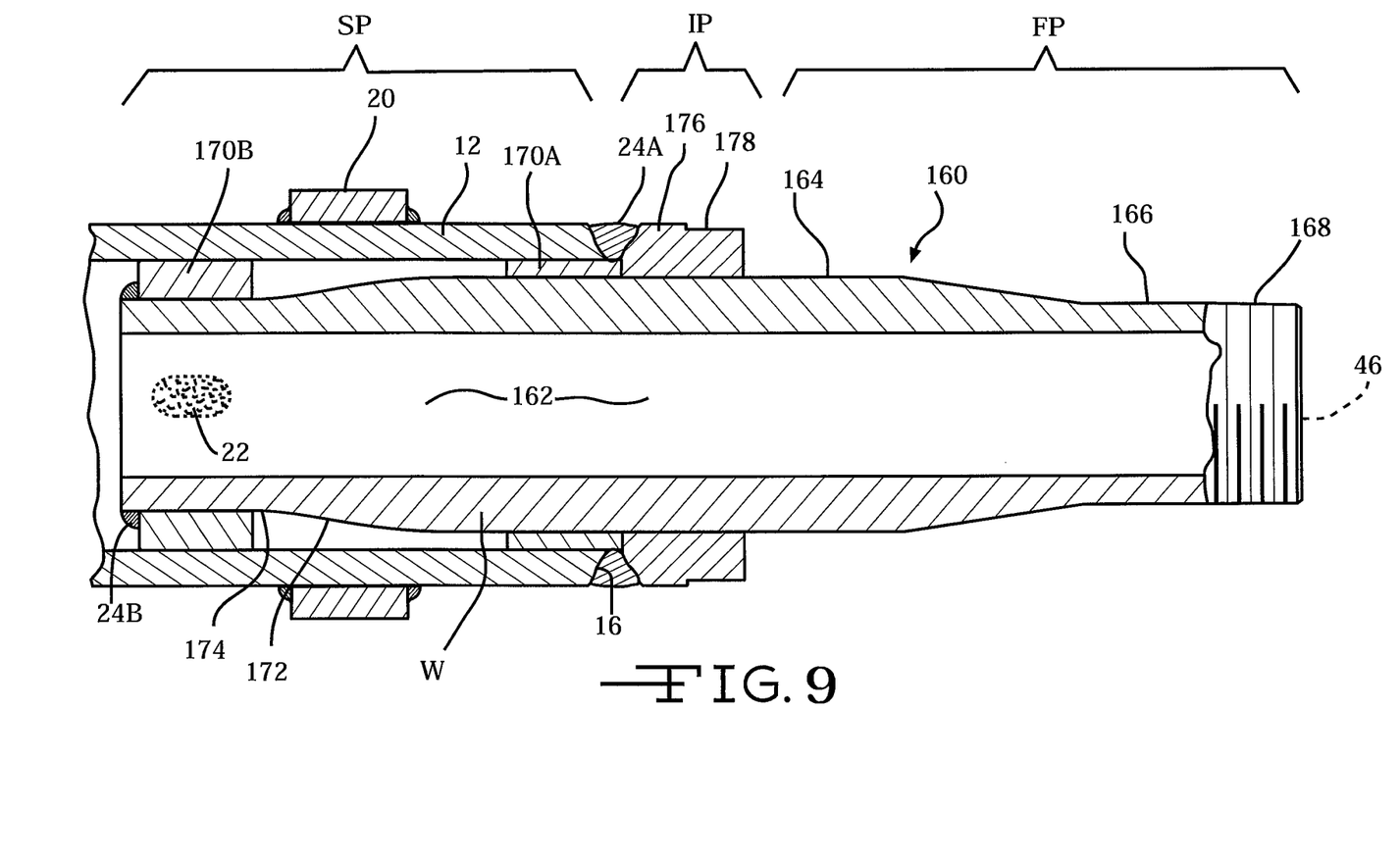
FIG. 9 is a longitudinal, full sectional view of a trailer axle incorporating a replacement spindle having a straight internal passageway, a short straight external taper and a pair of short liners having different inside diameters according to a seventh embodiment of the present invention.

Referring now to FIG. 9, a seventh embodiment of a replacement spindle assembly is illustrated and designated by the reference number 160. Here, the replacement trailer spindle assembly 160 is utilized with the vehicle axle 12 of conventional size defining the internal cylindrical surface 14. As in the previous drawing figures, a damaged portion of the axle (not illustrated) has been removed, leaving the circular cutoff surface 16. The trailer spindle assembly 160 includes a straight walled, i.e., constant diameter, internal through passageway 162, a first, larger diameter inner bearing surface 164, a second, smaller diameter outer bearing surface 166 and a threaded terminal portion 168. As in the other embodiments, the inner bearing surface 164 receives, positions and supports a first, larger diameter inner roller bearing assembly (not illustrated), the outer bearing surface 166 receives, positions and supports a second, smaller diameter roller bearing assembly (not illustrated) and the threaded terminal portion 168 receives a complementarily threaded nut which retains a wheel hub (both not illustrated) and the resilient plug 46.

The replacement trailer spindle assembly 160 utilizes two axially short liners 170A and 170B similar to those described in connection with the sixth embodiment of the replacement trailer spindle assembly 130, above, and includes the straight, i.e., constant diameter, inner surface 162. One of the two short liners 170A is disposed adjacent the cutoff surface 16 on the inner bearing surface 164. The trailer spindle assembly 160 also includes an axially short region of constant external taper, i.e., a frusto-conical surface 172 and a cylindrical, i.e., constant diameter end region 174. The other short liner 170B, which is thicker, is located on the constant diameter end region 174 of the spindle assembly 160. The short liner 170A adjacent the cutoff surface 16 is secured by built-up weld material 24A to the axle 12 and to a collar or sleeve 176 having an oil seal surface 178. The thicker, inner short liner 170B disposed on the constant diameter end region 174 of the spindle assembly 160 is secured by built-up weld material 24B. The pair of horizontal plug welds 22 (one of which is illustrated in FIG. 9) extend into the thicker, inner short liner 170B and secure the replacement spindle assembly 160 to the axle 12. Since this embodiment is characterized as a replacement trailer spindle assembly, it also includes the brake spider 20 which receives and supports the brake mechanism (not illustrated) of the trailer.

Figure 10:
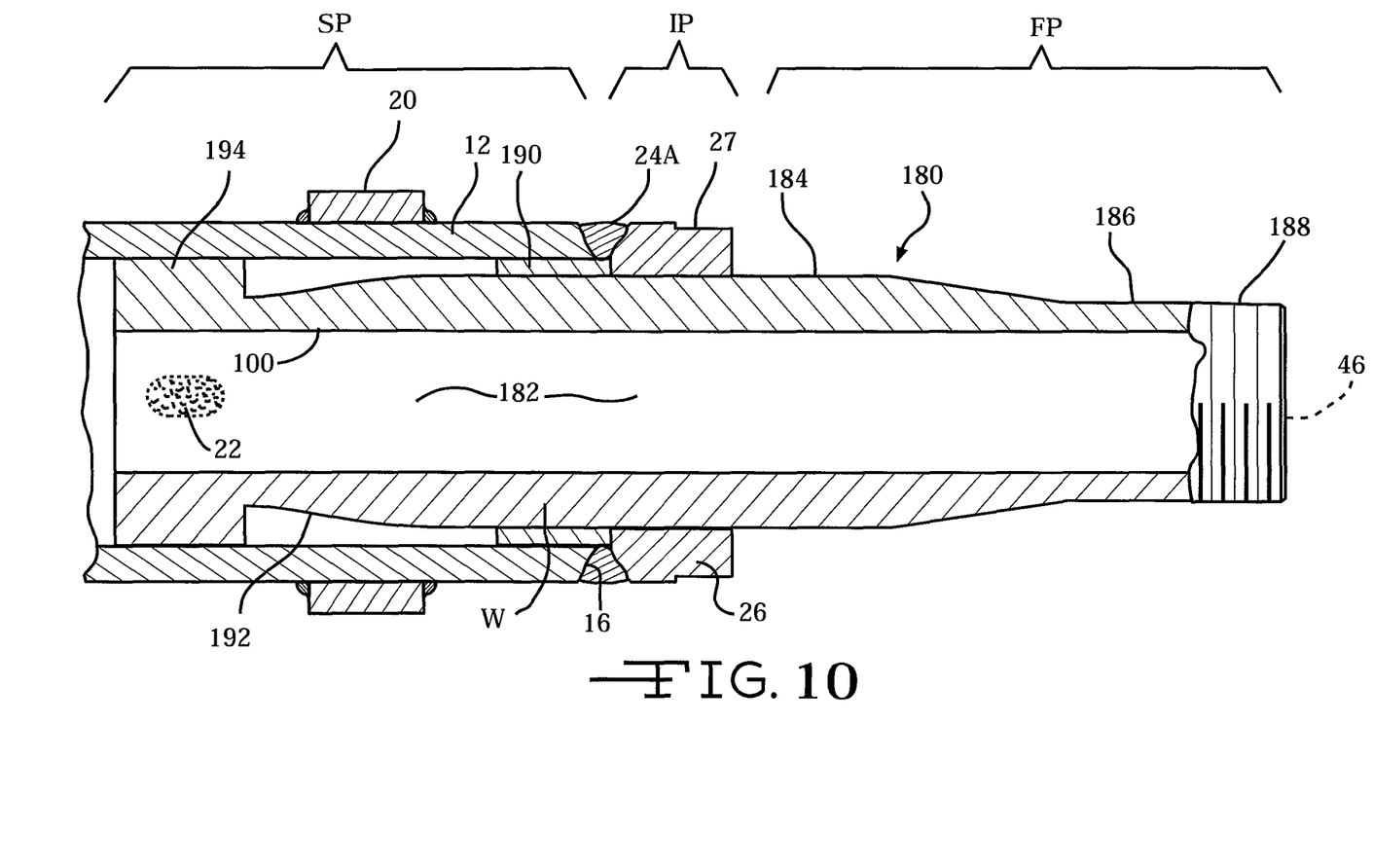
FIG. 10 is a longitudinal, full sectional view of a trailer axle incorporating a replacement spindle having a straight internal passageway, a straight external taper terminating in a larger diameter cylindrical end region and a single short liner according to an eighth embodiment of the present invention.

Referring now to FIG. 10, a eighth embodiment of a replacement spindle assembly is illustrated and designated by the reference number 180. The replacement trailer spindle assembly 180 is again utilized with the vehicle axle 12 of conventional size defining the internal cylindrical surface 14. As in the previous drawing figures, a damaged portion of the axle (not illustrated) has been removed, leaving the circular cutoff surface 16. The trailer spindle assembly 180 includes a straight walled, i.e., constant diameter, internal through passageway 182, a first, larger diameter inner bearing surface 184, a second, smaller diameter outer bearing surface 186 and a threaded terminal portion 188. As in the other embodiments, the inner bearing surface 184 receives, positions and supports a first, larger diameter inner roller bearing assembly (not illustrated), the outer bearing surface 186 receives, positions and supports a second, smaller diameter roller bearing assembly (not illustrated) and the threaded terminal portion 188 receives a complementarily threaded nut which retains a wheel hub (both not illustrated).

Here, the replacement trailer spindle assembly 180 utilizes only one axially short liner 190 similar to those liners described in connection with the embodiments 70 and 90 of the replacement trailer spindle assembly, above, and includes a straight, i.e., constant diameter, through passageway 182. The short liner 190 is disposed adjacent the cutoff surface 16 on the inner bearing surface 184. The trailer spindle assembly 160 includes an axially short region of constant external taper, i.e., a frusto-conical surface 192 and an integrally formed larger cylindrical, i.e., constant diameter, end region 194. The short liner 190 adjacent the cutoff surface 16 is secured by built-up weld material 24A to the axle 12 and to the collar or sleeve 26 having the oil seal surface 27. The pair of horizontal plug welds 22 (one of which is illustrated in FIG. 10) extend into the integrally formed larger cylindrical, i.e., constant diameter, end region 194 and secure the replacement spindle assembly 180 to the axle 12. Since this embodiment is characterized as a replacement trailer spindle assembly, it also includes the resilient plug 46 (illustrated in FIGS. 1 and 3) at the outer end of the spindle assembly 180 as well as the brake spider 20 which receives and supports the brake mechanism (not illustrated) of the trailer.

It will be appreciated that the foregoing three embodiments of the replacement spindle according to the present invention illustrated in FIGS. 8, 9 and 10 all achieve the weight saving of the other embodiments while being more readily and easily manufactured due to the constant diameter of the internal through passageways 132, 162 and 182. Furthermore, it should be understood that as an alternative to the single taper, frusto-conical outside surfaces 144, 172 and 192, the outside surface may define other profiles disclosed above, such as two distinct angles of taper or a parabolic curve, both of which, when utilized on the outside of a replacement spindle, are considered to be within the scope of this invention.

In addition to facilitating lubrication of the bearings of a tractor axle, the replacement spindle assemblies 30, 50, 70, 90, 110, 130, 160 and 180 all achieve significant weight reduction when compared to prior art spindle configurations. For example, a commonly used prior art replacement tractor (drive) spindle weighs approximately twenty-one pounds. A replacement spindle made in accordance with any of the configurations according to the present invention weighs approximately sixteen pounds. A commonly used prior art replacement trailer spindle assembly weighs between thirty-two and thirty-four pounds. A replacement trailer spindle assembly made in accordance with any of the configurations of the present invention weighs approximately twenty-two pounds. Additionally, utilization of the pair of sleeves 114A and 114B or 150A and 150B rather than a single piece sleeve can result is a weight saving of one to four pounds at each axle.

In every embodiment and application, it should be appreciated that the material and weight saving is achieved without a reduction in the necessary strength of the replacement spindle as more material is removed from that region (the inner end) of the replacement spindle subjected to the lowest forces and bending moments and less material is removed from the middle where forces and bending moments are higher. No material is removed from the outer end of the replacement spindle (relative to prior art drive spindle configurations) where the forces and bending moments are the highest.

It should also be appreciated that while each embodiment 30, 50, 70, 90, 110, 130, 160 and 180 of the replacement spindle assembly has been described as containing a specific combination of features, i.e., a particular taper configuration, utilization of one or two liners or sleeves, whether the spindle was a tractor (drive) or trailer spindle and thus how it was mounted to the vehicle axle and whether a resilient end plug was utilized to seal the end of the spindle, these foregoing descriptions are essentially illustrative and exemplary and it should be understood that any and all various combinations of the disclosed components and elements of the invention are deemed to be within its purview.

Hence, variations that do not depart from the gist of the invention are intended to be within the scope of the invention. Such variations are not to be regarded as a departure from the spirit and scope of the invention and the following claims.

What is claimed is:

1. A replacement spindle assembly for disposition and securement within an end of a hollow vehicle axle, comprising, in combination,
   an elongate tubular body having a first end portion, a second end portion, an intermediate portion between said first and second end portions and a through internal passageway,
   said first end portion having a first region adapted to receive a first bearing assembly, a second region spaced from said first region and adapted to receive a second bearing assembly, and a third region adjacent said second region having male threads,
   a collar disposed on said intermediate portion, said collar having an oil seal surface and designed and configured to align with said end of said hollow vehicle axle,
   said second end portion having a first, outer surface having a diameter smaller than an inside diameter of said hollow vehicle axle and extending from said intermediate portion and a second, inner surface extending from said intermediate portion and defining a part of said through passageway, said surfaces defining a wall having a greater thickness proximate said intermediate portion and a lesser thickness distant said intermediate portion.

2. The replacement spindle assembly of claim 1 wherein said first, outer surface is tapered.

3. The replacement spindle assembly of claim 1 wherein said second, inner surface defines a first tapering portion oriented at a small angle and a second tapering portion oriented at a larger angle.

4. The replacement spindle assembly of claim 1 wherein said second, inner surface defines a parabolic curve.

5. The replacement spindle assembly of claim 1 further including a metal sleeve having an inside diameter larger than an outside diameter of said intermediate portion.

6. The replacement spindle assembly of claim 1 further including a pair of sleeves, one of said pair of sleeves disposed adjacent said intermediate portion and another of said pair of sleeves disposed adjacent said lesser thickness wall.

7. The replacement spindle assembly of claim 1 wherein said first region adapted to receive a first bearing assembly is larger than said second region adapted to receive a second bearing assembly.

8. A replacement spindle assembly for disposition and securement within and end of a hollow vehicle axle, comprising, in combination,
   a substantially tubular body having a first end portion, a second end portion, an intermediate portion between said first and second end portions and a through internal passageway,
   said first end portion having a first region of a first diameter adapted to receive a first bearing assembly, a second region of a second diameter adapted to receive a second bearing assembly, a third region separating said first and second regions and a fourth region adjacent said third region having male threads,
   a metal collar disposed on said intermediate portion, said metal collar having an oil seal surface and designed and configured to align with said end of said hollow vehicle axle,
   said second end portion having a wall extending from said intermediate portion to a terminus and defining an outer surface having a diameter smaller than an inside diameter of said hollow vehicle axle and an inner surface, said wall having a first, greater thickness proximate said intermediate portion and a second, smaller thickness proximate said terminus.

9. The replacement spindle assembly of claim 8 wherein said outer surface includes a region of constant taper.

10. The replacement spindle assembly of claim 8 wherein said inner surface defines a first tapering region oriented at a first angle and a second tapering region oriented at a second angle larger than said first angle.

11. The replacement spindle assembly of claim 8 wherein said inner surface defines a parabolic curve.

12. The replacement spindle assembly of claim 8 wherein said inner surface includes a region of constant taper.

13. The replacement spindle assembly of claim 8 further including a sleeve having an inside diameter larger than said intermediate portion of said spindle.

14. The replacement spindle assembly of claim 8 wherein said diameters of said first and said second cylindrical bearing regions are different.

15. An improved replacement spindle assembly for disposition and securement within and end of a hollow vehicle axle, comprising, in combination,
   an elongate, tubular body having an outer surface, an inner surface, a first end and a second end,
   said outer surface defining a threaded region adjacent said first end, a first bearing receiving region adjacent said threaded region, a second bearing receiving region spaced from said first bearing receiving region, a cylindrical region adjacent said first bearing receiving region end, an intermediate region adjacent said first cylindrical region and a region extending from said intermediate region to said second end and having a diameter less than an inside diameter of said hollow vehicle axle,
   a metal collar disposed on said intermediate region, said metal collar having an oil seal surface and designed and configured to align with said end of said hollow vehicle axle,
   said inner surface and said outer surface defining a wall having a thickness which reduces from said intermediate region to said second end.

16. The improved replacement spindle assembly of claim 15 wherein said diameter of said second bearing receiving region is larger than the diameter of said first bearing receiving region.

17. The improved replacement spindle assembly of claim 15 wherein a diameter of said inner surface increases between said intermediate region and said second end.

18. The improved replacement spindle assembly of claim 15 wherein said inner surface defines a first tapering portion oriented at a first angle and a second tapering portion oriented at a second angle larger than said first angle between said intermediate region and said second end.

19. The improved replacement spindle assembly of claim 15 wherein a diameter of said outer surface decreases from said intermediate region to said second end.

20. The replacement spindle assembly of claim 15 further including at least one metal sleeve disposed on said spindle and having an inside diameter larger than an outside diameter of said intermediate region.

* * * * *